United States Patent [19]

Kitagishi et al.

[11] Patent Number: 4,695,133
[45] Date of Patent: Sep. 22, 1987

[54] HIGH RANGE ZOOM LENS

[75] Inventors: Nozomu Kitagishi; Sadatoshi Takahashi, both of Tokyo; Keiji Ikemori, Kanagawa; Kikuo Momiyama, Kanagawa; Tsunefumi Tanaka, Kanagawa, all of Japan

[73] Assignee: Canon Kabushiki Kaisha, Tokyo, Japan

[21] Appl. No.: 717,376

[22] Filed: Mar. 29, 1985

[30] Foreign Application Priority Data

Apr. 2, 1984 [JP] Japan ................................ 59-65489

[51] Int. Cl.$^4$ .............................................. G02B 15/16
[52] U.S. Cl. ........................................ 350/427; 350/423
[58] Field of Search .......................... 350/423, 427, 428

[56] References Cited

U.S. PATENT DOCUMENTS 4,494,828  1/1985  Masumoto et al. .................. 350/427
4,501,475  2/1985  Fujita et al. ....................... 350/427

FOREIGN PATENT DOCUMENTS 57-161824  10/1982  Japan ................................. 350/423

Primary Examiner—John K. Corbin
Assistant Examiner—Scott J. Sugarman
Attorney, Agent, or Firm—Toren, McGeady & Associates

[57] ABSTRACT

The disclosed zoom lens includes, from front to rear, a first lens unit of positive power, a second lens unit of negative power, a third lens unit of positive power, and a fourth lens unit. When zooming, the first and third lens units are axially moved independently of each other, the second lens unit remains stationary, and the fourth lens unit is axially moved but changes the direction of advance at an intermediate point in the zooming range.

11 Claims, 13 Drawing Figures

HIGH RANGE ZOOM LENS

BACKGROUND OF THE INVENTION

1. Field of the Invention

This invention relates to zoom lenses, and more particularly to zoom lenses of extended range in compact form, while still preserving good stability of aberration correction throughout the extended zooming range.

2. Description of the Prior Art

Though not very compact, many zoom lenses which enable a great increase in the range of variation of the focal length have been proposed. Zoom lenses of this type generally have four lens units, of which the first and third counting from front are axially movable for zooming.

In the zoom lens proposed in U.S. patent application Ser. No. 628,491 filed July 6, 1984 (corresponding to Japanese Patent Application No. SHO 58-128974), the first, second, third and fourth lens units have respectively positive, negative, positive and positive refractive powers from the front, and one zooms by moving the first and third lens units axially in differential relation to each other, while holding the second and fourth lens units stationary. Despite its remaining stationary during zooming, the second lens unit can be made to contribute to the magnification power varying effect by making first lens unit move axially forward as zooming proceeds from the wide angel to the telephoto end. Further, the third lens unit not only compensates for the image shift during zooming, but also contributes to a magnification power varying effect. In such a way, the prior art has achieved an increase in the zoom ratio of the zoom lens.

This type of zoom lens becomes conveniently compact for portability when set in the wide angle position, because its first lens unit is retracted toward the image plane. Also, the second lens unit whose refractive power is relatively strong is fixed in position. Thus, there is no possibility of introducing eccentricity of axis with zooming. Hence, the loss of the imaging performance due to the assembling operation can be minimized.

Furthermore, maintenance of the second lens unit in the accurately adjusted position within the lens barrel, allows loosening of the tolerance to which the other lens units must be held.

Also, the possibility of adjusting the position of the second lens unit with great accuracy allows for a further increase of its refractive power. As a whole, it is possible to achieve a shortening of the entire lens system in the longitudinal direction.

However, the use of this type of construction tends to increase the range of variation in image aberrations, particularly astigmatism in the intermediate zone of the picture frame. This tendency becomes prominent as the zoom range increases to, for example, 4 which the present invention attempts to obtain. In order to make the zoom lens compact, the refractive powers of the first, second and third lens units are necessarily increased. This also involves a large increase in the range of astigmatism variations. In the intermediate focal length positions, particularly the astigmatism and the spherical aberration vary in opposite directions so that their image surfaces no longer coincide.

In the above-described zoom lens, where the third lens unit is regarded as the compensator, the differential speed of movement of the third lens unit to that of movement of the first lens unit, or their ratio A (hereinafter called "cam inclination"), may be expressed by the following formula:

$$A = -\beta_{II}^2 \cdot \beta_{III}^2 / (1 - \beta_{III}^2)$$

where $\beta_{II}$ and $\beta_{III}$ are the magnification powers of the second and third lens units respectively. To use the third lens unit as the compensator, the conditions: $\beta_{III} \neq \pm 1$ must be satisfied through the zooming range. Because the third lens unit's contribution to the increase in the zoom ratio increases, if the magnification power $\beta_{III}$ is made to operate on the enlarging side of $-1$, the angle of cam inclination in either of the wide angle and telephoto ends increases greatly. Therefore, a large driving power is required for moving the third lens unit to or away from either of the wide angle and telephoto ends. This imparts a large stress to the operating mechanism for the zoom lens.

Such tendencies are intensified as the zoom ratio increases and the bulk size decreases.

SUMMARY OF THE INVENTION

A first object of the present invention is to provide a zoom lens which enables a great increase in the range of variation of the focal length to be achieved while still permitting an improvement of the compactness thereof.

A second object is to maintain a high grade of image quality throughout the zooming range which would be otherwise lowered by the eccentricity of axis if the second lens unit counting from the front which has a large magnification power varying effect were removed with zooming.

A third object is to maintain good correction of aberration throughout the zooming range and particularly to correct the astigmatism in the intermediate zone of the image field.

A further or fourth object is to prevent the cam inclination in the wide angle and telephoto ends from becoming steeper and to provide for the zoom lens with an operating mechanism of reduced stress.

BRIEF DESCRIPTION OF THE DRAWINGS

FIGS. 5(A) to 5(C), FIGS. 6(A) to 6(C) and FIGS. 7(A) to 7(C) are graphic representations of the various aberrations of the lenses of FIGS. 2 to 4 respectively.

DETAILED DESCRIPTION OF THE PREFERRED EMBODIMENTS

Figure 1:
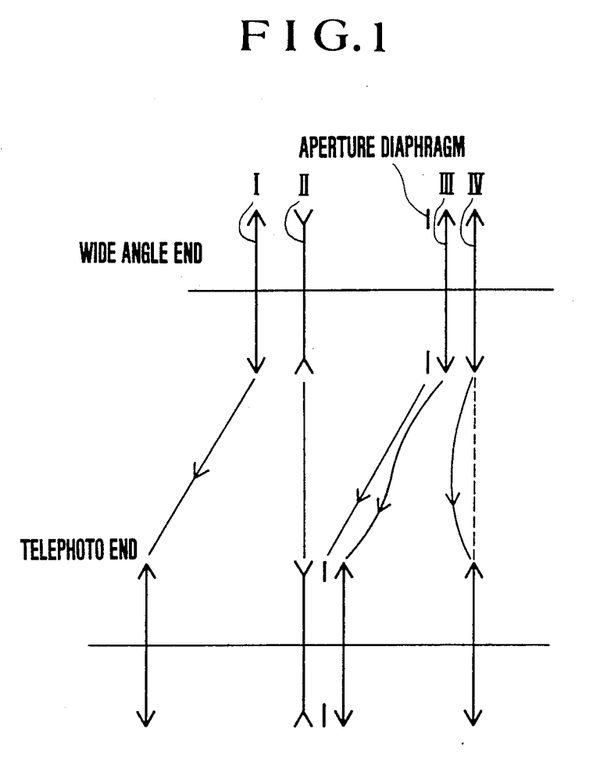
FIG. 1 is a schematic view of the optical arrangement of the invention.

FIG. 1 illustrates the principle of a zoom lens embodying the present invention. In this lens, a great increase in the range of variation of the focal length is achieved by doing the following. During zooming from the wide angle to the telephoto end, the first lens unit of positive power is moved axially forward with variation of the magnification power, while simultaneously allowing the second lens unit, though remaining stationary during zooming, also to produce a magnification power varying effect, and so that the axial movement of the third lens unit also contributes to the magnification power varying effect. The fourth lens unit which, in this instance, is of positive power, is moved along a path illustrated as convex toward the front so that its relative position to the first, second and third lens units is maintained proper, and, because its displacement occurs in a direction to compensate for the image deviation in the intermediate zone of the frame, a uniform image quality is obtained throughout the entire zooming range.

It is to be noted that the refractive power of the fourth lens unit may be either positive or negative, and in the negative case it moves first toward the rear and then toward the front. The fourth lens unit reciprocates, occupying almost the same position for the wide angle and telephoto ends in examples of specific lenses to be described later, but not necessarily returns to the same position.

Figure 2:
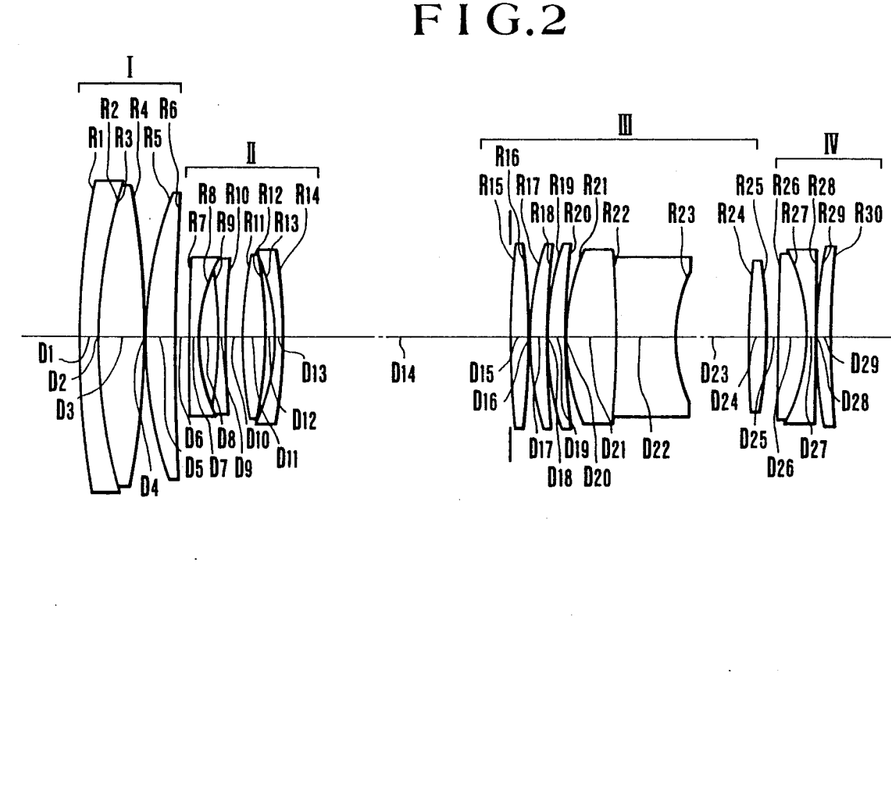
FIGS. 2, 3 and 4 are lens block diagrams of examples of specific zoom lenses of the invention.
Figure 3:
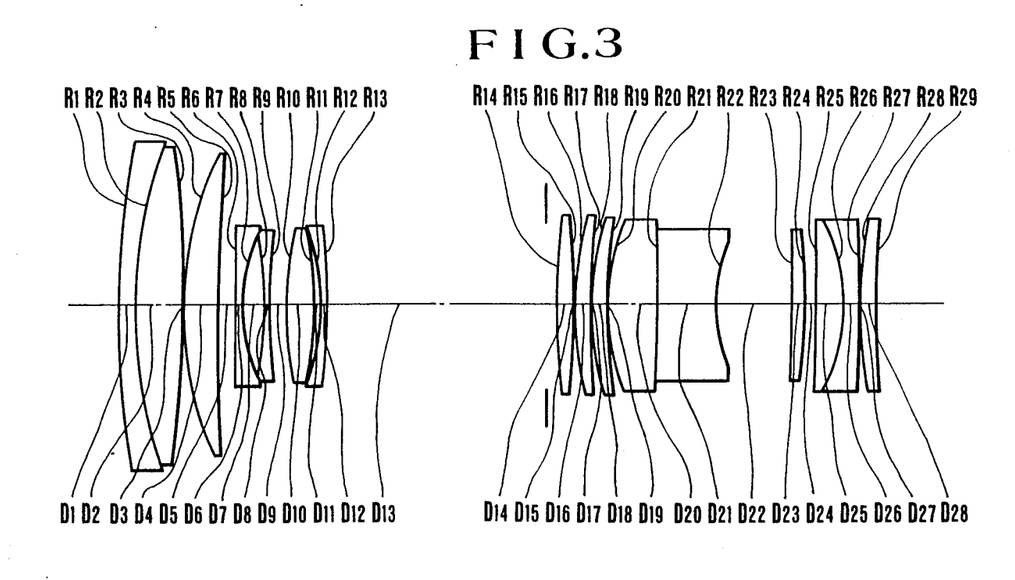
Figure 4:
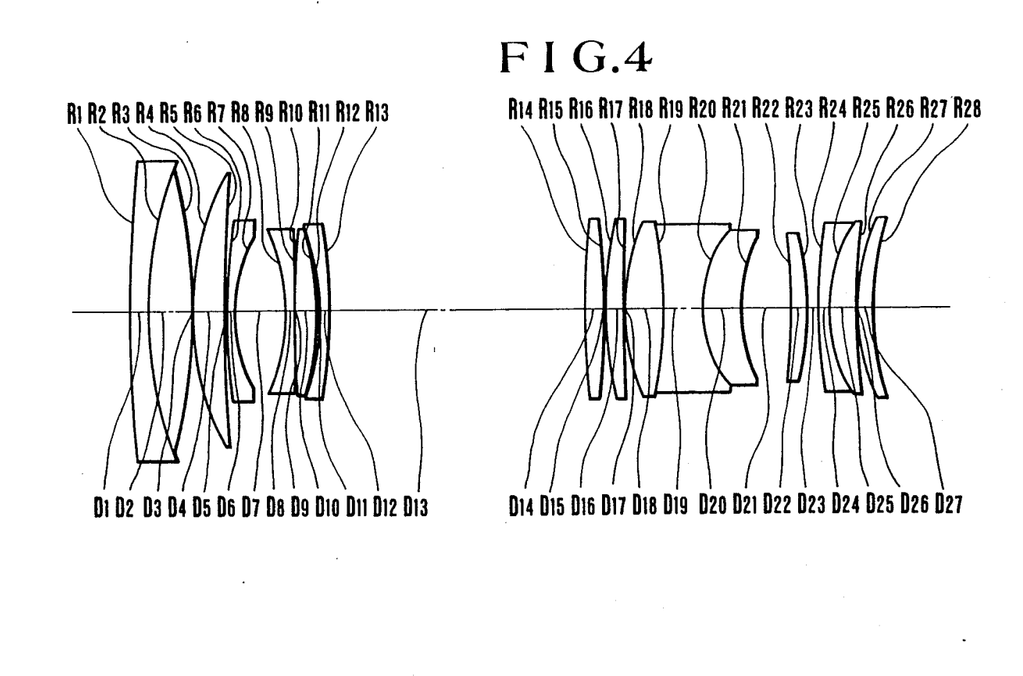
Figure 5A:
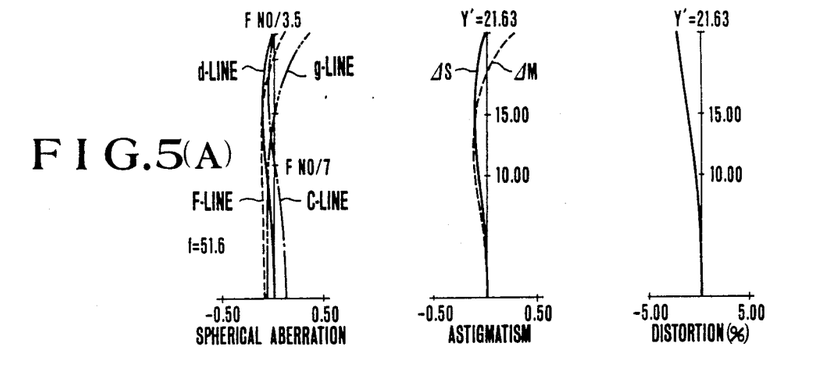
Figure 5B:
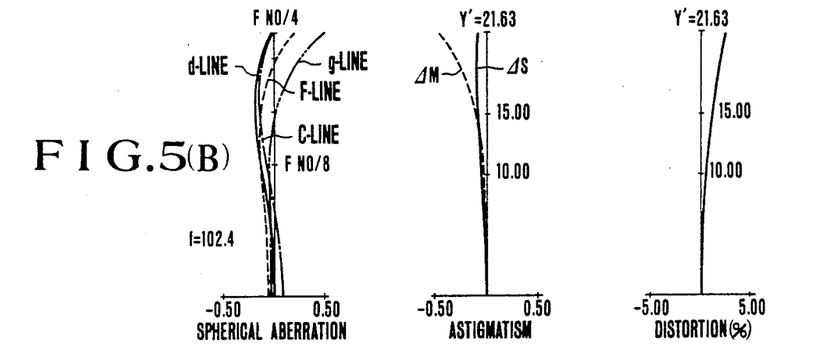
Figure 5C:
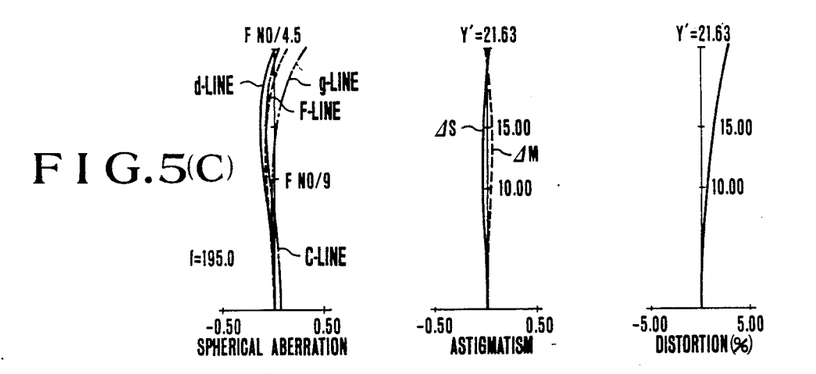
Figure 6A:
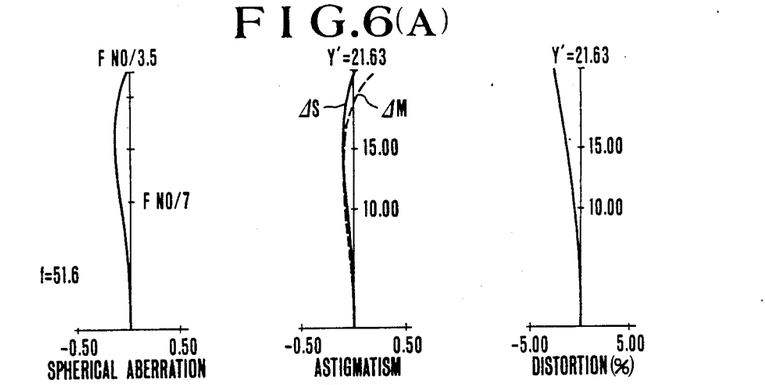
Figure 6B:
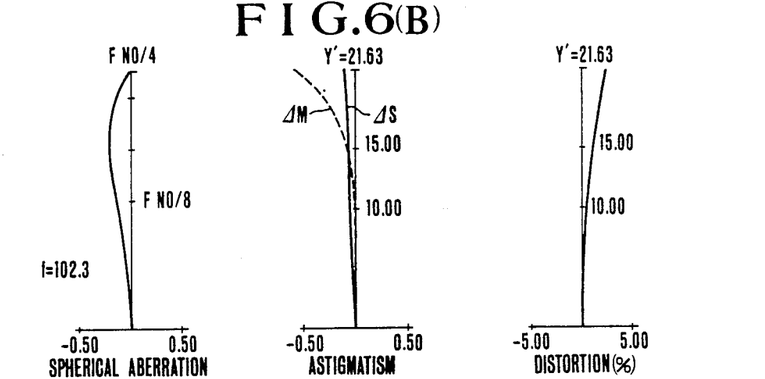
Figure 6C:
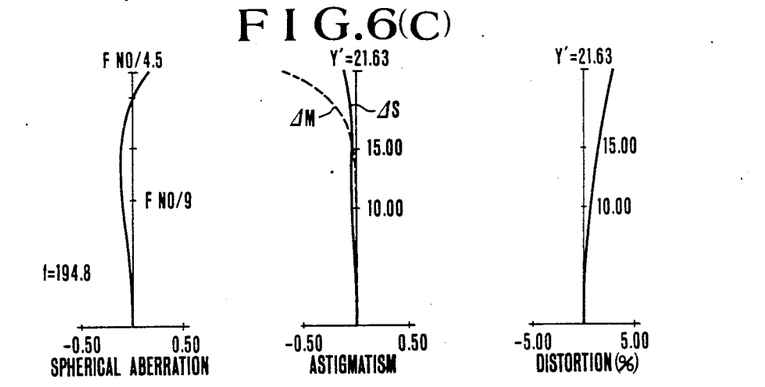
Figure 7A:
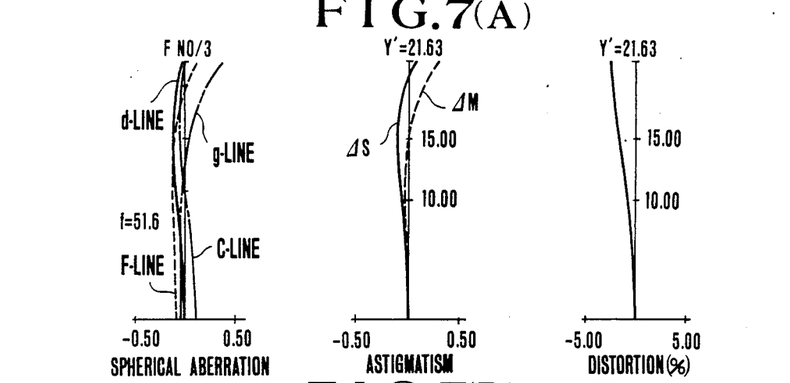
Figure 7B:
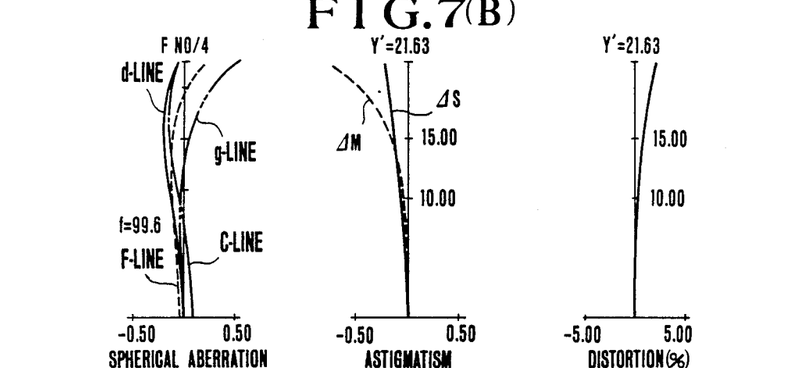
Figure 7C:
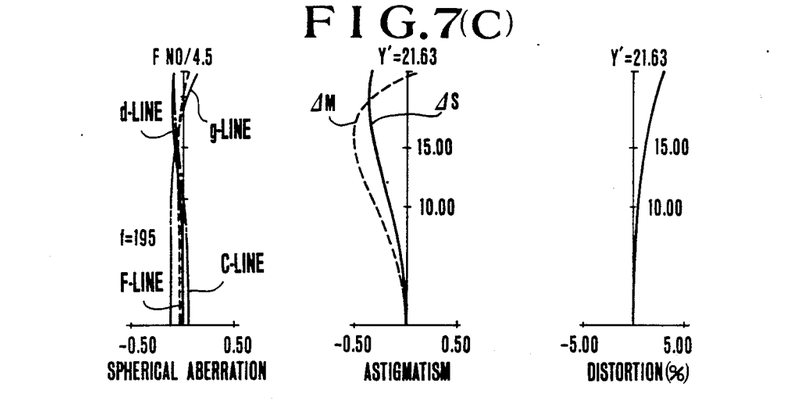

The zoom lenses shown in FIGS. 2 to 4 each comprise, from front to rear, first, second and third lens units of positive, negative and positive powers followed by a fourth lens unit. When zooming is performed from the wide angle end to the telephoto end, whilst the second lens unit being is held stationary, the first and third lens units are axially moved independently of each other, and the fourth lens unit is axially moved first in one direction, and then in the reversed direction, the change of direction occurring at an intermediate point in the zooming range, the zoom lens satisfying the following conditions:

$$1.5f_W < f_I < 2.5f_W \quad (1)$$

$$0.45f_W < |f_{II}| < 0.9f_W \quad (2)$$

$$0.6f_W < f_{III} < 1.5f_W \quad (3)$$

$$0.15f_W < S < 0.4f_W \quad (4)$$

where $f_I$, $f_{II}$ and $f_{III}$ are the focal lengths of the first, second and third lens units respectively, $f_W$ is the shortest focal length of the entire system, and S is the maximum movement of the fourth lens unit when zooming.

Inequalities of condition (1), (2) and (3) specify the ranges for the refractive powers of the first, second and third lens units respectively. If the first three lens units have their focal lengths determined within the specified ranges, improved results in compactness and stabilization of aberrations throughout the zooming range are attained.

When the focal length of the first lens unit increases beyond the upper limit of condition (1), the diameter of the front lens member becomes very large at the minimum object distance, and it becomes difficult to provide an improved compactness. When the lower limit is exceeded, variation of spherical aberration and astigmatism with zooming increases so largely that impartment of whatever movement into the fourth lens unit is difficult to stabilize astigmatism.

Inequalities of condition (2) concern the refractive power of the second lens unit. When the focal length of the second lens unit increases beyond the upper limit of condition (2), the total length of the complete lens becomes so large as to make it difficult to provide an improved compactness. When the focal length is shorter than the lower limit, variation of spherical aberration, coma, astigmatism and distortion with zooming increases objectionably.

Inequalities of condition (3) concern the refractive power of the third lens unit. When the focal length of the third lens unit increases beyond the upper limit, the total zooming movement of the third lens unit becomes so large that the total length of the complete lens is increased objectionably, because so large a space must be created within the lens system to allow the movement of the third lens unit. When the lower limit is exceeded, variation of spherical aberration and astigmatism is increased objectionably in the intermediate focal length region.

Inequalities of condition (4) concern the total movement of the fourth lens unit and when satisfied provides improved stabilization of astigmatism and spherical aberration against zooming. When the upper limit is exceeded, the cam inclinations for the third and fourth lens units in the telephoto region become very steep, making harder the zooming operation. When the lower limit is exceeded, insufficient stabilization of aberrations throughout the zooming range results.

The objects of the present invention are accomplished when the above-stated constructional features fall within the specified limits. But more preferably, the third lens unit is constructed to include, from front to rear, at least two lenses of positive power, a meniscus-shaped cemented lens of negative power convex toward the front having at least one positive and negative lens cemented together, and a lens of positive power.

By using such a power distribution over the third lens unit that the positive refractive power concentrate at the front, and the negative refractive powers concentrate at the rear and by specifying the lens form as such, the front principal plane of the third lens unit is put ahead the third lens unit to shorten the total length of the complete lens.

It is also to be noted that such asymmetric arrangement of the elements of the third lens unit increases variation of astigmatism with zooming. But this variation is corrected by controlling the movement of the fourth lens unit in manner such as described above. In total, a much-desired reduction in the bulk and size of the zoom lens system has been achieved in such a manner as to make it possible to maintain good stability of aberration correction throughout the extended zooming range.

Another assistance in stabilizing the aberrations against zooming can be obtained when an aperture stop is arranged between the second and third lens units to move together with the first lens unit. The use of such arrangement leads to simplification of the structure of an operating mechanism for the zoom lens.

Further, in the present invention, it is preferable to satisfy the following additional conditions:

$$-3 < K_W < 0.5 \quad (5)$$

$$-3 < K_T < 0.5 \quad (6)$$

where $K_W$ and $K_T$ are the ratios of the differential movement of the fourth lens unit to that of the first lens unit in the wide angle end (W) and the telephoto end (T) respectively, and the same direction in which the first and fourth lens units move is taken as positive.

In the zoom type having the second lens unit held stationary during zooming as in the present invention, the inclination of the cam for the third lens unit tends to increase. For this reason, to make movable the fourth lens unit is to reduce the degree of inclination of the cam of the third lens unit. The inclination of the cam of the third lens unit depends on the inclination of a cam for the fourth lens unit. In general, the degree of inclination of the cam increases in the wide angle and telephoto ends.

Therefore, the ratio of the speeds of movement of the first and fourth lens units is determined within the specified ranges by the inequalities of condition (5) and (6) to achieve a reduction of the inclination of the cam while preserving good stability of aberration correction throughout the extended zooming range.

In the inequalities of condition (5) and (6), the minus sign denotes the opposite direction in which the first and fourth lens units move.

When the values of $K_W$ and $K_T$ increase in the positive sense beyond the upper limits of conditions (5) and (6), the degree of inclination of the cam for the third lens group is increased objectionably. When they increase in the negative sense beyond the lower limits, the degree of inclination of the cam of the third lens unit becomes gentler, but the degree of inclination of the cam for the fourth lens unit is increased objectionably.

To carry out focusing of the zoom lens of the invention, from the standpoint of maintaining the aberrations stable throughout the focusing range, it is preferable to move the first lens unit. But, the second lens unit which remains stationary during zooming may be made movable for focusing. In this case, the total focusing movement of the second lens unit is shorter than when the first lens unit is used.

In the present invention, the fourth lens unit is preferably constructed with a cemented lens of positive and negative elements and a meniscus-shaped positive lens of forward convexity. The use of such construction provides an improved stabilization of the chromatic aberration throughout the zooming range.

Also, the only requirement for the zooming movement of the fourth lens unit is that its path is convex toward the front. If this requirement is fulfilled, there is no need to equalize the maximum distance it moves in one direction to that in the opposite direction.

In the present invention, the first lens unit moves along a linear path, and the third lens unit moves along a non-linear path. But, the first lens unit may be otherwised moved non-linearly to perform the function of compensating for the image shift. In this case, the third lens unit has to be moved linearly.

As has been described above, according to the present invention, a high range compact zoom lens corrected for good stability of aberration correction throughout the extended zooming range can be realized.

In particular, the present invention provides a method for well correcting the variation of astigmatism in the intermediate zone of the image frame with zooming of which the range increases with increase in the zoom ratio, and another method for reducing the inclination of the cam for the third lens unit to provide an improved smoothness of zooming operation.

Three examples of specific zoom lenses of the invention can be constructed in accordance with the numerical data given in the following tables for the radii of curvature, R, the axial thicknesses and air separations, D, and the refractive indices, N, and the Abbe numbers, $\nu$, of the glasses of the lens elements with the subscripts numbered consecutively from front to rear.

NUMERICAL EXAMPLE 1

| F = 51.6 − 195 | FNO = 1:3.5 − 4.5 | 2ω = 45.5° − 12.7° | |
|---|---|---|---|
| R1 = 162.33 | D1 = 2.80 | N1 = 1.75520 | ν1 = 27.5 |
| R2 = 85.54 | D2 = 0.04 | | |
| R3 = 85.54 | D3 = 8.00 | N2 = 1.43387 | ν2 = 95.1 |
| R4 = −156.72 | D4 = 0.12 | | |
| R5 = 70.54 | D5 = 5.10 | N3 = 1.51633 | ν3 = 64.1 |
| R6 = 394.54 | D6 = Variable | | |
| R7 = −1540.91 | D7 = 1.40 | N4 = 1.88300 | ν4 = 40.8 |
| R8 = 31.11 | D8 = 3.36 | | |
| R9 = −65.35 | D9 = 1.20 | N5 = 1.79952 | ν5 = 42.2 |
| R10 = 162.02 | D10 = 2.76 | | |
| R11 = 64.76 | D11 = 4.60 | N6 = 1.84666 | ν6 = 23.9 |
| R12 = −64.76 | D12 = 1.16 | | |
| R13 = −37.74 | D13 = 1.20 | N7 = 1.77250 | ν7 = 49.6 |
| R14 = −110.99 | D14 = Variable | | |
| R15 = 125.83 | D15 = 3.30 | N8 = 1.49700 | ν8 = 81.6 |
| R16 = −125.83 | D16 = 0.10 | | |
| R17 = 52.03 | D17 = 3.10 | N9 = 1.61700 | ν9 = 62.8 |
| R18 = 177.14 | D18 = 0.10 | | |
| R19 = 58.23 | D19 = 2.70 | N10 = 1.69895 | ν10 = 30.1 |
| R20 = 120.71 | D20 = 0.12 | | |
| R21 = 39.28 | D21 = 8.61 | N11 = 1.53256 | ν11 = 45.9 |
| R22 = −297.21 | D22 = 9.95 | N12 = 1.84666 | ν12 = 23.9 |
| R23 = 25.93 | D23 = 13.00 | | |
| R24 = 903.83 | D24 = 3.00 | N13 = 1.72000 | ν13 = 43.7 |
| R25 = −79.88 | D25 = Variable | | |
| R26 = −1699.68 | D26 = 5.00 | N14 = 1.59270 | ν14 = 35.3 |
| R27 = −29.26 | D27 = 1.50 | N15 = 1.72047 | ν15 = 34.7 |
| R28 = −404.52 | D28 = 0.10 | | |
| R29 = 86.85 | D29 = 2.70 | N16 = 1.69680 | ν16 = 55.5 |
| R30 = 213.01 | | | |

| | f | | |
|---|---|---|---|
| D | 51.6 | 102.4 | 195 |
| D6 | 2.692 | 23.355 | 39.590 |
| D14 | 38.747 | 19.439 | 1.867 |
| D25 | 2.000 | 9.489 | 38.879 |

NUMERICAL EXAMPLE 2

| F = 51.6 − 194.8 | FNO = 1:3.5 − 4.5 | 2ω = 45.5° − 12.7° | |
|---|---|---|---|
| R1 = 231.84 | D1 = 2.80 | N1 = 1.80518 | ν1 = 25.4 |
| R2 = 91.24 | D2 = 7.70 | N2 = 1.51633 | ν2 = 64.1 |
| R3 = −165.83 | D3 = 0.33 | | |
| R4 = 69.67 | D4 = 5.00 | N3 = 1.51633 | ν3 = 64.1 |
| R5 = 436.92 | D5 = Variable | | |
| R6 = −1850.44 | D6 = 1.40 | N4 = 1.83481 | ν4 = 42.7 |
| R7 = 30.20 | D7 = 3.50 | | |
| R8 = −63.36 | D8 = 1.20 | N5 = 1.80610 | ν5 = 40.9 |
| R9 = 165.41 | D9 = 2.80 | | |
| R10 = 65.13 | D10 = 4.70 | N6 = 1.84666 | ν6 = 23.9 |
| R11 = −65.13 | D11 = 1.19 | | |
| R12 = −37.56 | D12 = 1.20 | N7 = 1.77250 | ν7 = 49.6 |
| R13 = −111.75 | D13 = Variable | | |
| R14 = 121.88 | D14 = 3.02 | N8 = 1.48749 | ν8 = 70.1 |
| R15 = −121.88 | D15 = 0.13 | | |
| R16 = 53.44 | D16 = 2.90 | N9 = 1.60311 | ν9 = 60.7 |
| R17 = 197.84 | D17 = 0.06 | | |
| R18 = 54.58 | D18 = 2.75 | N10 = 1.68893 | ν10 = 31.1 |
| R19 = 109.41 | D19 = 0.06 | | |
| R20 = 41.44 | D20 = 8.43 | N11 = 1.54869 | ν11 = 45.6 |
| R21 = −277.45 | D21 = 10.05 | N12 = 1.84666 | ν12 = 23.9 |
| R22 = 26.43 | D22 = 12.93 | | |
| R23 = 9584.93 | D23 = 2.45 | N13 = 1.72000 | ν13 = 43.7 |
| R24 = −74.70 | D24 = Variable | | |
| R25 = −1188.89 | D25 = 5.00 | N14 = 1.59551 | ν14 = 39.2 |
| R26 = −28.66 | D26 = 2.75 | N15 = 1.72342 | ν15 = 38.0 |
| R27 = −382.40 | D27 = 0.19 | | |
| R28 = 86.43 | D28 = 2.85 | N16 = 1.60311 | ν16 = 60.7 |
| R29 = 296.57 | | | |

| | f | | |
|---|---|---|---|
| D | 51.6 | 102.3 | 194.8 |
| D5 | 3.129 | 23.792 | 40.027 |
| D13 | 37.811 | 18.510 | 0.961 |
| D24 | 1.601 | 9.083 | 38.450 |

NUMERICAL EXAMPLE 3

| F = 51.6 − 195 | FNO = 1:3.5 − 4.5 | 2ω = 45.5° − 12.7° |
|---|---|---|

| | | | |
|---|---|---|---|
| R1 = 325.87 | D1 = 2.80 | N1 = 1.70154 | ν1 = 41.2 |
| R2 = 66.65 | D2 = 8.00 | N2 = 1.43387 | ν2 = 95.1 |
| R3 = −88.76 | D3 = 0.10 | | |
| R4 = 55.30 | D4 = 4.80 | N3 = 1.48749 | ν3 = 70.1 |
| R5 = 220.49 | D5 = Variable | | |
| R6 = 128.90 | D6 = 1.50 | N4 = 1.80400 | ν4 = 46.6 |
| R7 = 33.31 | D7 = 8.72 | | |
| R8 = −31.98 | D8 = 1.50 | N5 = 1.77250 | ν5 = 49.6 |
| R9 = −3796.77 | D9 = 0.07 | | |
| R10 = 164.63 | D10 = 3.70 | N6 = 1.84666 | ν6 = 23.9 |
| R11 = −56.34 | D11 = 0.59 | | |
| R12 = −43.48 | D12 = 1.50 | N7 = 1.61800 | ν7 = 63.4 |
| R13 = −91.49 | D13 = Variable | | |
| R14 = 136.24 | D14 = 3.20 | N8 = 1.60311 | ν8 = 60.7 |
| R15 = −148.64 | D15 = 0.10 | | |
| R16 = 62.50 | D16 = 3.50 | N9 = 1.65160 | ν9 = 58.6 |
| R17 = 406.19 | D17 = 0.10 | | |
| R18 = 38.27 | D18 = 6.90 | N10 = 1.48749 | ν10 = 70.1 |
| R19 = −72.18 | D19 = 6.71 | N11 = 1.69895 | ν11 = 30.1 |
| R20 = 19.53 | D20 = 6.43 | N12 = 1.84666 | ν12 = 23.9 |
| R21 = 27.06 | D21 = 8.50 | | |
| R22 = −148.35 | D22 = 3.00 | N13 = 1.73520 | ν13 = 41.1 |
| R23 = −54.48 | D23 = Variable | | |
| R24 = 92.62 | D24 = 1.50 | N14 = 1.74400 | ν14 = 44.7 |
| R25 = 25.57 | D25 = 5.00 | N15 = 1.56384 | ν15 = 60.7 |
| R26 = 150.85 | D26 = 0.08 | | |
| R27 = 37.91 | D27 = 3.00 | N16 = 1.69680 | ν16 = 55.5 |
| R28 = 55.36 | | | |

| D | f | | |
|---|---|---|---|
| | 51.6 | 99.6 | 195 |
| D5 | 0.553 | 16.556 | 35.343 |
| D13 | 44.338 | 21.373 | 1.125 |
| D23 | 2.000 | 10.061 | 45.212 |

What is claimed is:

1. A zoom lens comprising:
   from front to rear, a first lens unit of positive power, a second lens unit of negative power, a third lens unit of positive power and a fourth lens unit,
   when zooming, said second lens unit remaining stationary, said first lens unit and said third lens unit moving along an optical axis independently of each other, and said fourth lens unit moving in such a manner that the direction of advance changes on the way.

2. A zoom lens according to claim 1, wherein said fourth lens unit has a positive power and when zooming moves first toward the object and then toward the image.

3. A zoom lens according to claim 2, wherein the axial position said fourth lens unit occupies when in the wide angle end of the zooming range is substantially coincident with the axial position it occupies when in the telephoto end.

4. A zoom lens according to claim 1, wherein when zooming, one of said first lens unit and said third lens unit moves along a linear path, and the other moves along a non-linear path.

5. A zoom lens according to claim 4, wherein said first lens unit moves along a linear path, and said third lens unit moves along a non-linear path.

6. A zoom lens according to claim 1, further comprising:
   a diaphragm between said second lens unit and said third lens unit,
   said diaphragm moving in unison with said first lens unit.

7. A zoom lens according to claim 1, wherein said third lens unit includes at least two positive lenses, a meniscus cemented lens of forward convexity having positive and negative lenses cemented together, and a positive lens.

8. A zoom lens according to claim 1, satisfying the following relationships:

$$-3 < K_W < 0.5$$

$$-3 < K_T < 0.5$$

where $K_W$ and $K_T$ are the ratios of the differential movement of said fourth lens unit to the differential movement of said first lens unit in the wide angle and telephoto ends of a zooming range respectively, and the directions of movement of said two lens units when being the same are taken as positive.

9. A zoom lens comprising:
   from front to rear, a first lens unit of positive power, a second lens unit of negative power, a third lens unit of positive power and a fourth lens unit,
   when zooming, said second lens unit remaining stationary, said first lens unit and said third lens unit moving along an optical axis, and said fourth lens unit moving in such a manner that the direction of advance changes on the way, and satisfying the following inequalities:

$$0.15 f_W < S < 0.4 f_W$$

where S is the maximum axial movement of said fourth lens unit during zooming, and $f_W$ is the shortest focal length of the entire lens system.

10. A zoom lens according to claim 9, satisfying the following inequalities:

$$1.5 f_W < f_I < 2.5 f_W$$

$$0.45 f_W < |f_{II}| < 0.9 f_W$$

$$0.6 f_W < f_{III} < 0.5 f_W$$

wherein $f_I$, $f_{II}$ and $f_{III}$ are the focal lengths of the first, second and third lens units respectively.

11. A zoom lens according to claim 9, satisfying the following conditions:

$$-3 < K_W < 0.5$$

$$-3 < K_T < 0.5$$

where $K_W$ and $k_T$ are the ratios of the differential movement of said fourth lens unit to the differential movement of said first lens unit in the wide angle and telephoto ends of a zooming range respectively, and the same direction of movement is taken as positive.

* * * * *